United States Patent
Hayashi

(10) Patent No.: US 6,786,599 B2
(45) Date of Patent: Sep. 7, 2004

(54) POLARIZED LENS OF PLASTIC LAMINATION AND THE PRODUCTION METHOD OF THE SAME

(75) Inventor: Hokao Hayashi, Fukui (JP)

(73) Assignee: Nicoh Optical Co., Ltd., Fukui (JP)

( * ) Notice: Subject to any disclaimer, the term of this patent is extended or adjusted under 35 U.S.C. 154(b) by 84 days.

(21) Appl. No.: 10/206,079

(22) Filed: Jul. 29, 2002

(65) Prior Publication Data

US 2003/0179459 A1 Sep. 25, 2003

(30) Foreign Application Priority Data

Mar. 20, 2002  (JP) ......................................... 2002-079167

(51) Int. Cl.[7] .............................. G02C 7/06; G02C 7/10
(52) U.S. Cl. ......................................... 351/163; 351/177
(58) Field of Search ................................. 351/163, 177

(56) References Cited

U.S. PATENT DOCUMENTS 5,181,141 A * 1/1993 Sato et al. .................. 359/580
5,757,459 A * 5/1998 Bhalakia et al. ............ 351/168

* cited by examiner

Primary Examiner—Scott J. Sugarman
(74) Attorney, Agent, or Firm—Snider & Associates; Ronald R. Snider

(57) ABSTRACT

A polarized lens of plastic lamination is provided, which lens is of high quality and highly durable in use while being inexpensively and stably producible without inconsistency in quality.

The issues of the prior polarized plastic lens as produced by the blanking and hot machining method, the injection mold-heat bonding method or the sandwiching method are solved by making the most of the ductility and casting performance inherent in diethylene glycol bis(allyl carbonate) and combining therewith the optical characteristics of a polarized film made of poly(vinyl alcohol) resin as well as transparency and durability inherent in a polycarbonate resin plate so as to produce a polarized lens of plastic lamination.

8 Claims, 4 Drawing Sheets

Shock

POLARIZED LENS OF PLASTIC LAMINATION AND THE PRODUCTION METHOD OF THE SAME

RELATED APPLICATION

This application claims the priority of Japanese Patent Application No. 2002-79167 filed on Mar. 20, 2002, which application is incorporated herein by reference.

BACKGROUND OF THE INVENTION

1. Technical Field

The present invention relates to a polarized lens of plastic lamination and the production method thereof, in more details, pertaining to such polarized plastic lens as being highly consistent in quality and excellent in durability in comparison with the prior counterparts and the method for producing the same lens in an efficient and economical manner.

2. Prior Art

Conventionally, the following three methods of producing a polarized plastic lens that is used for shading the sunlight or protecting the eyes of the operators working in harsh environments and conditions are known.

(1) A blanking and hot machining method wherein a polarized film made from poly (vinyl alcohol) whose surfaces are coated with an adhesive is interposed for pasting between two synthetic resin thin plates, and the plastic polarized article as obtained is subjected to blanking operation so as to be formed into a circular shape, which article is subjected to vacuum forming operation within an electric furnace so as to produce a polarized lens with curvature.

(2) An injection mold-heat bonding method wherein a synthetic resin, from which resin a lens matrix layer is molded, is injected into a metallic mold and a polarized plate made from polycarbonate resin is press-bonded onto the convex surface of the matrix layer while the synthetic resin as injected is still sticky under heat so as to produce a polarized lens.

(3) A sandwiching method wherein a polarized film made from poly (vinyl alcohol) whose surfaces are coated with an adhesive is sandwiched between two plastic lens plates with curvature so as to produce a polarized lens. To note, hard-coating treatment by such conventional method as dip coating is performed on the surfaces of the polarized lens as produced by the above three methods.

However, as to the above blanking and hot machining method, the circular polarized plastic article is subjected to high-temperature molding heat during the vacuum forming operation so as to tend to bring the quality of the finished products into inconsistency, in addition to which the curvature of the lens as formed by the vacuum forming operation chronologically fails and there arises distortion on the surface thereof as well as the polarized lens as obtained is easily subjected to aberration owing to residual stress.

As to the above injection mold-heat bonding method, the synthetic resin polarized plate does not just fit the surface of the matrix layer so as to allow air bubbles to occur at the interface thereof while as to the above sandwiching method, it allows air bubbles to occur at the interface between the polarized film and the respective plastic lens plates so as to make the hue of the polarized lens as obtained inconsistent. Any of the conventional polarized lenses as mentioned above lacks uniformity in quality and is poor at yielding, which results in the increase of the number of defects as well as the production cost. Thus, a plastic polarized lens of higher quality and reasonable price is hoped for.

DISCLOSURE OF THE INVENTION

In view of the above inconveniences encountered with the conventional plastic polarized lens as adopted for sunglasses and eyes-protection glasses, the present invention is firstly to provide a plastic polarized lens that is highly consistent in quality and excellent in durability in comparison with such prior polarized lens as produced by the above methods (1), (2) and (3).

Further, the present invention is secondly to provide a method for efficiently producing a high-quality plastic polarized lens wherein the adoption of a casting resin essentially consisting of diethylene glycol bis(allyl carbonate) having lower viscosity and higher ductility prevents distortion or air bubbles from occurring at the interfaces between the respective plastic laminations.

Further, the present invention is thirdly to provide a method for economically producing a high-quality plastic polarized lens free from such quality problems as aberration by restraining the occurrence of defects almost to none.

The means to solve the above issues is described below with reference to the accompanying drawings.

The first issue of the present invention is solved by laminating the concave side surface of the polarized film layer 1 made from poly (vinyl alcohol) resin onto the convex side surface of the lens matrix layer 2 made from polycarbonate resin through the polymerization setting layer 3 made from diethylene glycol bis(allyl carbonate) resin and forming the polymerization setting layer 4 made from ethylene glycol bis(allyl carbonate) resin on the convex side surface of the polarized film layer 1 so as to provide the plastic polarized lens of an integrally laminated structure comprising the respective layers 1, 2, 3 and 4.

The second and third issues of the present invention are solved by adopting a method comprising the steps of dropping a casting resin R of lower viscosity essentially consisting of ethylene glycol bis(allyl carbonate) into a concave cavity C of a casting die D; overlaying a convex side surface of a polarized film 1' made from poly(vinyl alcohol) resin, which side surface corresponds to the concave surface of the cavity C, onto the cavity C so as to uniformly spread and attach the casting resin R onto the convex side surface of the polarized film 1'; dropping the casting resin R into the concave side surface of the polarized film 1' and overlaying a convex side surface of a lens matrix plate 2' made from polycarbonate resin onto said concave side surface of said polarized film 1' with said casting resin R thereon so as to uniformly spread and attach the casting resin R onto the convex side surface of the lens matrix plate 2'; polymerizing and setting the casting resin R as uniformly spread and attached on said convex side surfaces of said polarized film 1' and said lens matrix plate 2' under heat treatment so as to obtain an integral polarized lens prototype Lb; and performing finishing operation on said prototype Lb so as to produce a polarized lens L of plastic lamination.

BEST MODE FOR CARRYING OUT THE INVENTION

Hereinafter, the preferred embodiments of the polarized lens of plastic lamination and the production method thereof according to the present invention are described below with reference to the accompanying drawings.

(First Embodiment)

Figure 1:
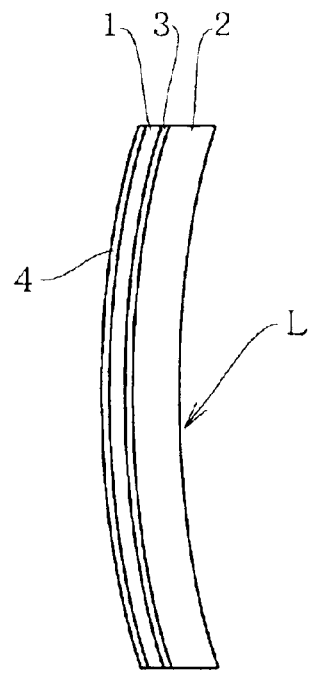
FIG. 1 is an edge side view of a polarized lens of plastic lamination according to the first embodiment of the present invention.

The polarized lens (non-prescription lens with the focal length of ∞) of plastic lamination according to the present embodiment as shown in FIG. 1 integrally comprises a polymerization setting layer 4 made from diethylene glycol bis(allyl carbonate) resin, which layer is disposed at the outermost convex side surface of the lens, a polarized film layer 1 made from poly (vinyl alcohol) resin, the convex side surface of which layer is laminated onto the polymerization setting layer 4, a polymerization setting layer 3 made from ethylene glycol bis(allyl carbonate) resin, which layer is laminated onto the concave side surface of the polarized film layer 1 and a lens matrix layer 2 made from polycarbonate resin, which layer is laminated onto the concave side surface of the polymerization setting layer 3. The polarized lens of the present embodiment has 70 mm in diameter, the outermost polymerization setting layer 4 at the convex side surface of which lens has 0.1 mm in thickness, the polarized film layer 1 of which lens has 1 mm in thickness, the polymerization setting layer 3 of which lens and that is disposed at the concave side surface of the polarized film layer 1 has 0.1 mm in thickness and the lens matrix layer 2 of which lens has 5 mm in thickness. To note, polyvinyl butyral is thinly coated onto the convex and concave side surfaces of the polarized film layer 1 of the lens according to the present embodiment so as to strengthen adhesion between the respective polymerization setting layers 3 and 4 and the polarized film layer 1, which is not shown in the drawing.

(Second Embodiment)

Figure 2:
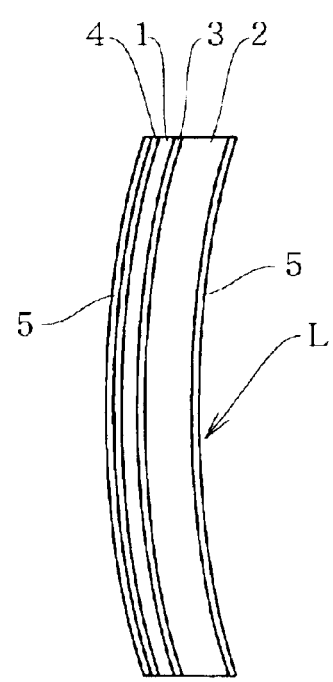
FIG. 2 is an edge side view of a polarized lens of plastic lamination, on which surfaces hard-coating operation is performed, according to the second embodiment of the present invention.

FIG. 2 shows the polarized lens of plastic lamination according to the second embodiment of the present invention. The difference between the first and the present embodiments lies in that a hard-coating layer 5 having 0.05 mm in thickness that is produced by Tokuyama Co., Ltd. and the trade name of which is 'TS-56T' is coated onto the convex side surface of the polymerization setting layer 4 and the concave side surface of the lens matrix layer 2, respectively.

(Third Embodiment)

Figure 3:
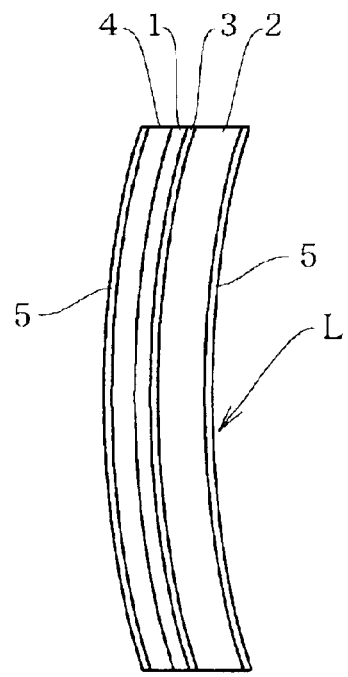
FIG. 3 is an edge side view of a polarized lens of plastic lamination, the convex side polymerization setting layer of which lens is thickened, according to the third embodiment of the present invention.

FIG. 3 shows the polarized lens of plastic lamination according to the present embodiment. The difference between the second and the present embodiment lies in that the polymerization setting layer 4 is arranged larger in thickness, in inverse proportion to which the lens matrix layer 2 is arranged smaller in thickness. The polarized lens of plastic lamination according to the present embodiment has 70 mm in diameter, the polymerization setting layer 4 disposed at the convex side surface of which lens has 3 mm in thickness, the polarized film layer 1 of which lens has 1 mm in thickness, the polymerization setting layer 3 disposed at the concave side surface of which film layer 1 has 0.1 mm in thickness, the lens matrix layer 2 of which lens has 3 mm in thickness and the hard-coating layer 5 disposed at the respective sides of which lens has 0.05 mm in thickness. The polymerization setting layer 4 disposed at the convex side surface of the polarized lens according to the present embodiment is cast from ethylene glycol bis(allyl carbonate) resin, which is optically balanced, and is arranged larger in thickness, which makes the finished lens more durable in use and lighter in weight synergistically with the characteristics of the polycarbonate resin from which the lens matrix layer 2 is cast. Moreover, where the ambient light penetrates into the lens matrix layer 2 through the polymerization setting layer 4 as mentioned above and the polarized film layer 1, the polarized rays are removed from the incident light so that there is no case where a so-called 'diffusion of red light' that is inherent in the lens made from polycarbonate resin wherein the light as internally reflected within the lens appears to shine with tremulously diffused red light occurs so as to restrain the spectacle wearers from suffering from eyestrains.

PRODUCTION EXAMPLE

Hereinafter, the production method of the polarized lens of plastic lamination according to the above first embodiment is described with reference to FIGS. 4 to 8.

Figure 4:
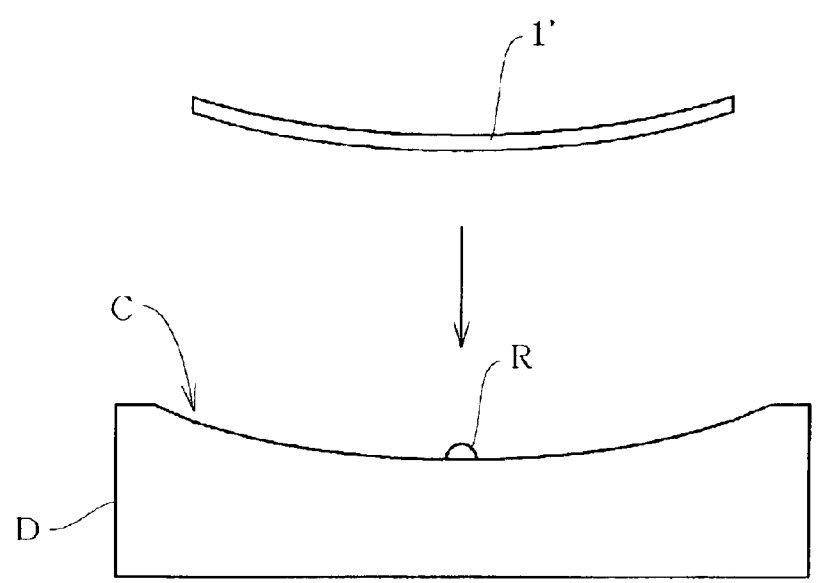
FIG. 4 shows the steps of dropping a casting resin onto the cavity of the casting die and overlaying a polarized film onto the cavity.

In FIG. 4, reference D indicates a casting die made from glass, the upper surface of which die is concavely and smoothly carved out so as to form a cavity C.

For the production of the polarized lens of the first embodiment, 0.4 cc of a casting resin R is dropped into the central portion of the cavity C, which resin is a solution prepared by mixing 60 wt. % of diethylene glycol bis(allyl carbonate) monomer that is produced by Nihon Yushi Kabushiki Kaisha under the trade name of 'RAV-7AT' with an initiator or 6 wt. % of diisopropyl peroxydicarbonate produced by Nihon Yushi Kabushiki Kaisha under the trade name of 'RAV-7BT', the viscosity of which solution amounts to 13.5 cps under the temperature of 25° C.

Then, a polarized film 1' made from poly(vinyl alcohol) resin and having 1 mm in thickness is overlaid onto the casting resin R as dropped into the cavity C of the die D such that the convex side surface of the film concentrically aligns with the cavity C, which allows the resin R to be uniformly spread onto the convex side surface of the film 1' so as to form a resin portion 4'. To note, polyvinyl butyral is coated beforehand onto the respective side surfaces of the film 1' as an adhesive.

Figure 5:
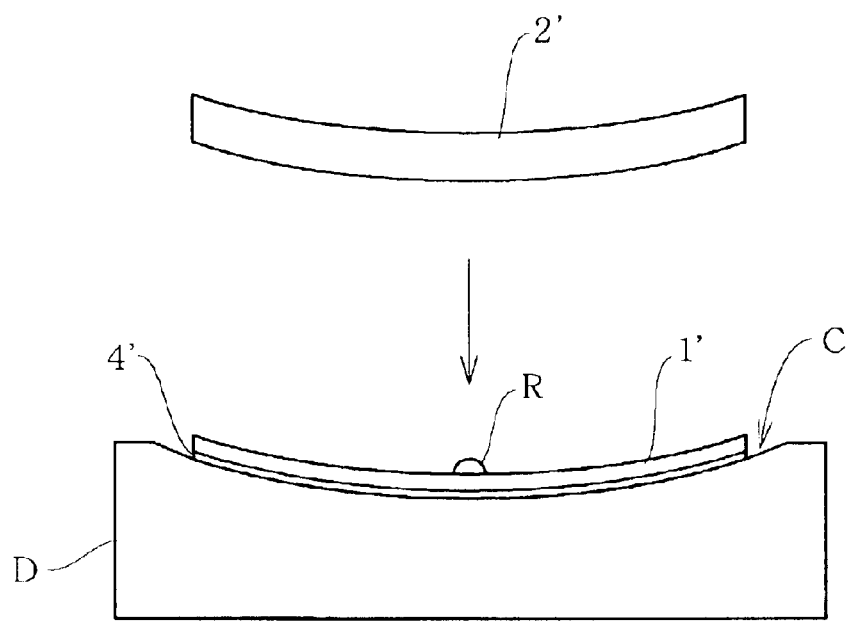
FIG. 5 shows the steps of dropping a casting resin onto the polarized film done with the steps as shown in FIG. 4 and overlaying a lens matrix plate onto the polarized film.
Figure 6:
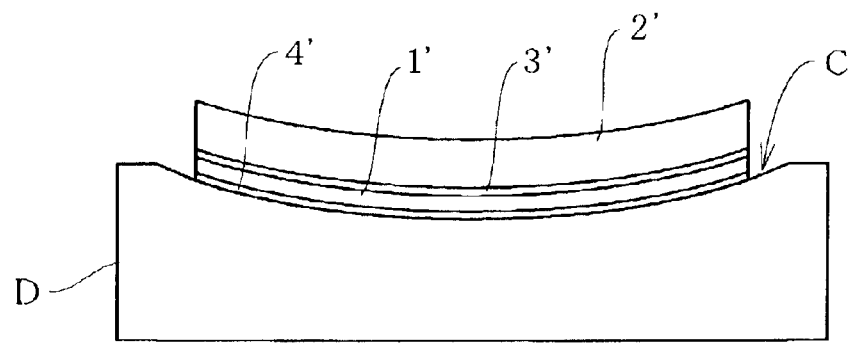
FIG. 6 shows the state where the lens matrix plate is overlaid onto the polarized film with the resin spread thereon.

Then, as shown in FIG. 5, 0.4 cc of the resin R is dropped onto the central portion of the concave side surface of the film 1' as laminated onto the resin portion 4', onto which resin a lens matrix plate 2' made from polycarbonate resin having 5 mm in thickness is overlaid with the concave side surface thereof on top, which allows the resin R as centrally dropped into the concave side surface of the film 1' to be uniformly spread onto the convex side surface of the lens matrix plate 2' as shown in FIG. 6 so as to form a resin portion 3'.

Figure 7:
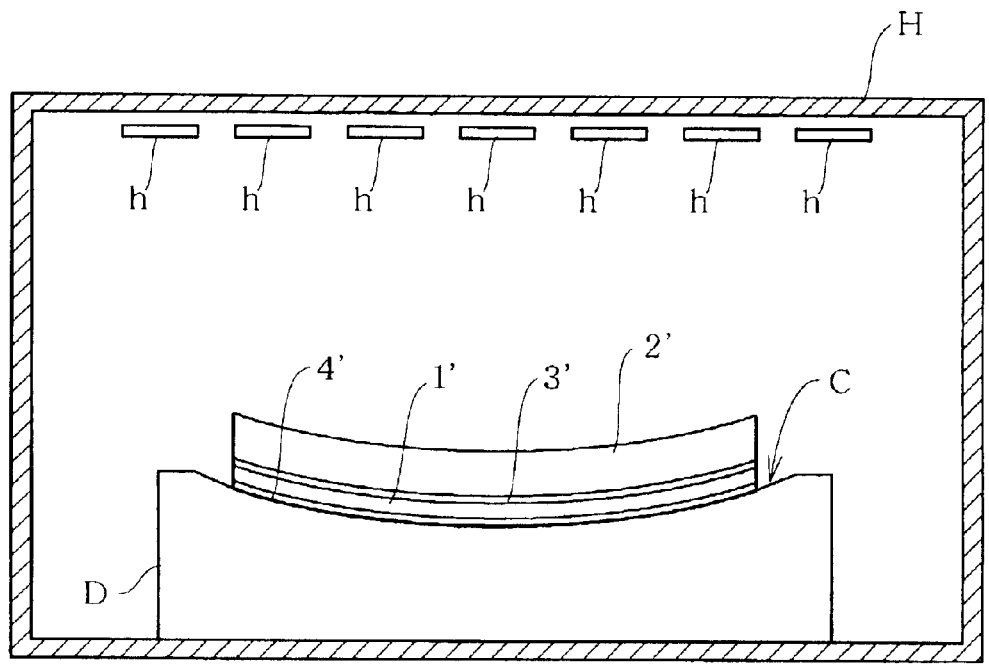
FIG. 7 is a view to show the polymerization process of subjecting a lens prototype contained in a far infrared radiation heater to polymerization setting operation.

Initial polymerization operation is performed on the respective components 1', 2', 3' and 4' as integrally laminated on the casting die D, as shown in FIG. 7, by arranging them in a far infrared radiation heater H together with the die D and keeping them therein for about three hours under the temperature ranging from 35 to 50° C., which components and die are heated to complete polymerization reaction for about five hours under the temperature of approximately 90° C. at the completion of the initial polymerization. To note, reference h in plurality as shown in FIG. 7 indicates a ceramic far infrared radiation element.

Figure 8:
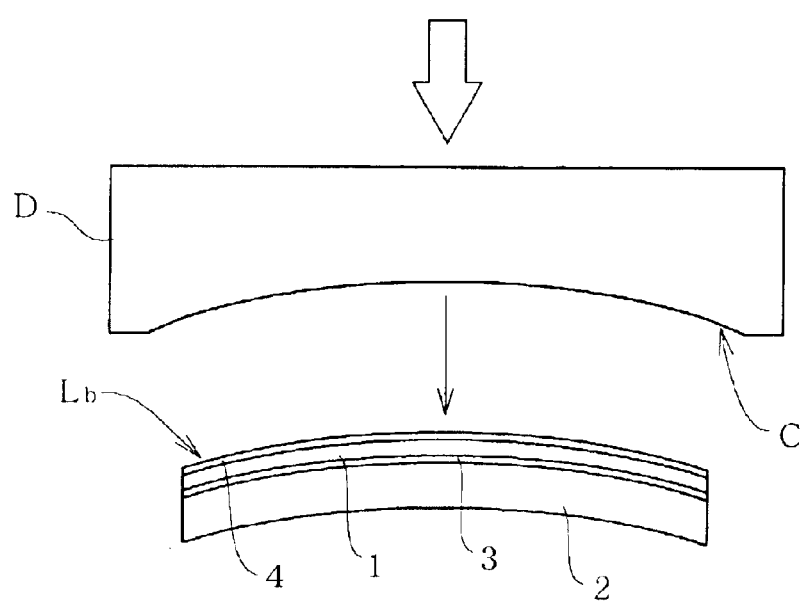
FIG. 8 is a view to show the state where the lens prototype as subjected to the polymerization setting operation is taken out of the casting die.

At the completion of the polymerization reaction, the casting die D is taken out of the heater H. On the cavity C of the die D, the diethylene glycol bis(allyl carbonate) monomer as polymerized and set is integrated with the other components so as to be formed into a polarized prototype lens Lb. This prototype Lb is attached onto the cavity C, but is easy to detach from the glass surface thereof so that it is detached therefrom without difficulty by striking lightly the backside surface of the die D, as shown in FIG. 8.

The prototype lens Lb as detached from the die D is subjected to such finishing operation as removing burrs from and cleansing the same so as to be provided to the market as a polarized lens L.

MODIFIED EXAMPLES

The preferred embodiments of the present invention are substantially described above, but it is not limited to them, which may be modified into various manners within the scope of the accompanying patent claims.

For instances, in the above embodiments and production example, it is exemplified that polyvinyl butyral resin is coated as an adhesive onto the respective side surfaces of the polarized film made from poly(vinyl alcohol) resin upon the lamination of the film onto the casting resin, which adhesive does not necessarily intervene in the interfaces of the laminated layers. Further, any adhesive will do as far as it is good at transparency and compatible with diethylene glycol bis(allyl carbonate). The poly(vinyl alcohol) resin may be adopted for the adhesive, which modification also belongs to the technical scope of the present invention.

The polarized lens may be produced by mixing various kinds of pigments, photochromics, an ultraviolet rays absorbent or an infrared rays absorbent with the diethylene glycol bis(allyl carbonate) monomer adopted for the casting resin in the present invention or by combining some of them to be mixed therewith, which modification also belongs to the technical scope of the present invention.

As described above, the polarized lens of plastic lamination according to the present invention is produced by making the most use of the ductility and casting performance inherent in diethylene glycol bis(allyl carbonate) and combining therewith the optical characteristics of the polarized film made from poly(vinyl alcohol) resin as well as the transparency and durability of the polycarbonate resin, which solves the pending issues altogether that are unavoidable in the prior counterparts as produced by the blanking and hot machining method, the injection mold-heat bonding method and the sandwiching method as exemplified above.

The above production arrangement allows a high-quality polarized plastic lens free from quality problems such as aberration and highly durable in use to be realized and a high-performance polarized lens of plastic lamination, in the interfaces of which lamination there occurs neither distortion nor air bubbles, to be produced in an efficient manner with the occurrence of defects restrained almost to none.

In view of the foregoing, the polarized lens of plastic lamination of the present invention is epoch-making and the production method thereof is highly efficient and economical, the industrial applicability of which is very high.

What is claimed is:

1. A polarized lens of plastic lamination wherein a concave side surface of a polarized film layer 1 made from poly(vinyl alcohol) resin is laminated through a polymerization setting layer 3 made from diethylene glycol bis(allyl carbonate) onto a convex side surface of a lens matrix layer 2 made from polycarbonate resin while on a convex side surface of said polarized film layer 1 a polymerization setting layer 4 made from ethylene glycol bis(allyl carbonate) is formed so as to provide a polarized lens of lamination structure.

2. A polarized lens of plastic lamination according to claim 1 wherein a thickness of said polymerization setting layer 4 as formed on the convex side surface of said polarized film layer 1 amounts to approximately 0.1 mm.

3. A polarized lens of plastic lamination according to claim 1 wherein the ethylene glycol bis(allyl carbonate) resin disposed on the convex side surface of said polarized film layer 1 is polymerized and set so as to make said polymerization setting layer 4 large in thickness.

4. A polarized lens of plastic lamination according to claim 1 wherein said lens as a whole covering said polymerization setting layer 4 as disposed at the convex side surface of said polarized film layer 1 and said lens matrix layer 2 is coated with a hard-coating layer 5.

5. A method for producing a polarized lens of plastic lamination comprising the steps of dropping a casting resin R of low viscosity essentially consisting of ethylene glycol bis(allyl carbonate) into a concave cavity C of a casting die D; overlaying a convex side surface of a polarized film 1' made from poly(vinyl alcohol) resin onto said concave cavity C that corresponds to said convex side surface of said polarized film 1' so as to uniformly spread and attach said casting resin R on said convex side surface of said polarized film 1'; dropping said casting resin R into a concave side surface of said polarized film 1' and overlaying a convex side surface of a lens matrix plate 2' made from polycarbonate resin onto said concave side surface of said polarized film 1' with said casting resin R thereon so as to uniformly spread and attach said casting resin R on said convex side surface of said lens matrix plate 2'; polymerizing and setting said casting resin R as uniformly spread and attached on said convex side surfaces of said polarized film 1' and said lens matrix plate 2' under heat treatment so as to obtain an integral polarized lens prototype Lb; and performing finishing operation on said prototype Lb so as to produce a polarized lens L.

6. A method for producing a polarized lens of plastic lamination according to claim 5 wherein an adhesive of high transparency is preliminarily coated onto said respective convex and concave side surfaces of said polarized film 1' to be overlaid onto said casting resin R as dropped into a central portion of said cavity C.

7. A method for producing a polarized lens of plastic lamination according to claim 5 wherein a quantity of said casting resin R to be dropped into said cavity C is increased for adjustment such that said casting resin R to be spread and attached on said convex side surface of said polarized film 1' forms a thicker polymerization setting layer 4.

8. A method for producing a polarized lens of plastic lamination according to claim 5 wherein hard-coating operation is performed on a whole surface of said polarized lens L as obtained through said finishing operation.

\* \* \* \* \*